United States Patent [19]

Naito

[11] Patent Number: 4,677,513
[45] Date of Patent: Jun. 30, 1987

[54] MAGNETO-OPTIC THIN FILM HEAD AND METHOD OF USE

[75] Inventor: Hiroichi Naito, Kanagawa, Japan

[73] Assignee: Fuji Photo Film Co., Ltd., Japan

[21] Appl. No.: 686,526

[22] Filed: Dec. 27, 1984

[30] Foreign Application Priority Data

Dec. 29, 1983 [JP] Japan ................... 58-252001

[51] Int. Cl.$^4$ .................... G11B 5/127; G11B 7/12
[52] U.S. Cl. ........................... 360/114; 369/13
[58] Field of Search ............... 360/114, 59; 369/13; 365/121, 122

[56] References Cited

U.S. PATENT DOCUMENTS

| 2,560,430 | 7/1951 | Friend | 360/114 |
| 4,618,901 | 10/1986 | Hatakeyama et al. | 360/114 |

FOREIGN PATENT DOCUMENTS

| 0132186 | 1/1985 | European Pat. Off. | 360/114 |
| 60-143462 | 7/1985 | Japan | 360/114 |
| 0477454 | 9/1975 | U.S.S.R. | 360/114 |
| 0479147 | 10/1975 | U.S.S.R. | 360/114 |
| 0518795 | 7/1976 | U.S.S.R. | 360/114 |
| 0501411 | 11/1976 | U.S.S.R. | 360/114 |
| 0540286 | 2/1977 | U.S.S.R. | 360/114 |
| 0972576 | 11/1982 | U.S.S.R. | 360/114 |
| 1138828 | 2/1985 | U.S.S.R. | 360/114 |

Primary Examiner—Raymond F. Cardillo
Assistant Examiner—Hoa T. Nguyen
Attorney, Agent, or Firm—Gerald J. Ferguson, Jr.; Michael P. Hoffman; Ronni S. Malamud

[57] ABSTRACT

In a system for reproducing magnetically recorded information, a magnetic recording medium is moved in contact with a gap of a magnetic circuit. A light beam is linearly polarized and is made to impinge upon a magnetic layer of an inductive type magnetic thin film head for detecting the recorded information on the basis of a change in internal magnetization so that the light beam is incident obliquely with respect to the magnetic layer in a plane approximately parallel to the direction of internal magnetization of the magnetic layer and approximately normal to a substrate of the magnetic thin film head. The light beam reflected by the magnetic layer is detected, and the direction of the internal magnetization is detected on the basis of the rotation angle of the plane of polarization of the reflected light beam.

6 Claims, 7 Drawing Figures

MAGNETO-OPTIC THIN FILM HEAD AND METHOD OF USE

BACKGROUND OF THE INVENTION

1. Field of the Invention

This invention relates to a method of reproducing magnetically recorded information by reading out the information from a magnetic recording medium such as a magnetic tape or a magnetic disk by use of a magnetic thin film head, and an apparatus for carrying out the method. This invention particularly relates to a method of reproducing magnetically recorded information by making a light beam impinge upon an inductive type magnetic thin film head and detecting a change in intensity of the light beam reflected by the magnetic thin film head, which is caused by the Kerr effect, thereby detecting the internal magnetization direction in the magnetic thin film head, and an apparatus for carrying out the method.

2. Description of the Prior Art

As the method of recording information in a magnetic recording medium such as a magnetic tape or a magnetic disk and reproducing the information therefrom, various methods have heretofore been known, and various new techniques have been developed by improving the magnetic material and the magnetic head for increasing the recording density. In order to improve the recording density markedly, it is necessary that signal reproduction be achieved at a sufficiently high output even when the movement speed of the magnetic tape or the magnetic disk with respect to the magnetic head is decreased considerably. However, in the case of an inductive type magnetic head, the output naturally decreases to an impracticable level when the tape speed (rotation speed of the magnetic disk) during the signal reproduction is decreased. Further, in the case of the inductive type magnetic head, since the reproduction output level depends on the track width, the extent to which the track density can be increased by decreasing the track width is limited. However, a need exists for further increase of the track density.

Accordingly, instead of the inductive type magnetic head which outputs the speed of change in the internal magnetization of the magnetic head, a magnetic flux response type magnetic head which directly responds to the direction and the degree of magnetization in a magnetic recording medium has recently been proposed. The magnetic flux response type magnetic head is called a magnetic resistive head. In the magnetic flux response type magnetic head, since signal reproduction output does not depend on the tape feed speed or the track width, it is possible to reproduce information recorded at a high density. However, the magnetic flux response type magnetic head is practically disadvantageous in that the signal reproduction output fluctuates greatly with changes in temperature, that the manufacture cost is high since the magnetic head has a special configuration, and that it is not always possible to obtain a magnetic head exhibiting consistent characteristics.

It has also been proposed to make a light beam impinge upon a special magneto-optic recording medium, detect the light beam reflected by the recording medium, and read out the condition of internal magnetization of the recording medium by utilizing the Kerr effect. However, this system is practically disadvantageous in that a special magneto-optic recording medium must be used.

SUMMARY OF THE INVENTION

The primary object of the present invention is to provide a method of reproducing magnetically recorded information wherein magnetic flux response type reproduction is achieved by use of a conventional magnetic recording medium such as a magnetic tape together with a magnetic head obtained by partially modifying the conventional inductive type magnetic thin film head.

Another object of the present invention is to provide a method of reproducing magnetically recorded information which realizes reproduction of information recorded at a high density and which is suitable for practical use.

The specific object of the present invention is to provide an apparatus for carrying out the method.

The present invention is characterized by using a transparent material as the substrate of the magnetic thin film head, making a light beam obliquely impinge upon the magnetic thin film head from the substrate side, and detecting the rotation of the plane of polarization of the light beam reflected by the magnetic thin film head, which is caused by the longitudinal Kerr effect, thereby detecting the internal magnetization direction of the magnetic thin film head.

That is, the present invention is characterized by photoelectrically detecting the direction and the degree of internal magnetization in the magnetic thin film head by utilization of the longitudinal Kerr effect, whereby magnetic flux response type signal detection is made possible instead of inductive type signal detection and the recorded information is detected even when the magnetic recording medium is moved at a very low speed.

In the present invention, it is possible to conduct magnetic flux response type reproduction by using a conventional magnetic recording medium such a magnetic tape or a magnetic disk and a magnetic head obtained simply by replacing the substrate of the conventional magnetic this film head with a transparent substrate. Therefore, reproduction of the information recorded at a high density is realized at a low cost, and the present invention is very advantageous in practical use.

Specifically, in the present invention, since the level of the reproduction output signal does not depend on the track width but depends on the power of the light beam such as a laser beam used for reproduction, it is possible to prevent decrease of the reproduction output by adjusting the power of the light beam even when the track width is small. Accordingly, it becomes possible to reproduce information recorded with a small track width at a high track density.

DESCRIPTION OF THE PREFERRED EMBODIMENTS

The present invention will hereinbelow be described in further detail with reference to the accompanying drawings.

Figure 1:
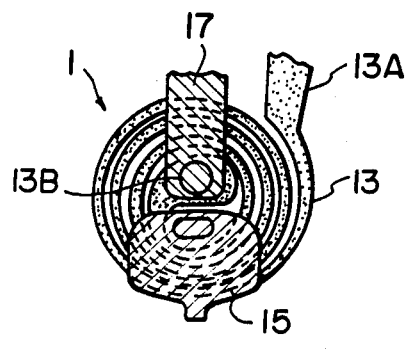
FIG. 1 is a front view showing an example of the magnetic thin film head used in the method of reproducing magnetically recorded information in accordance with the present invention.
Figure 2:
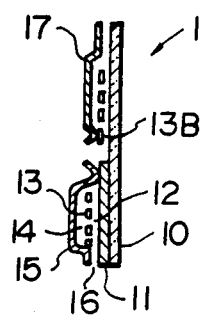
FIG. 2 is a vertical sectional view of FIG. 1.

FIG. 1 is a front view showing the basic configuration of a magnetic thin film head 1, and FIG. 2 is a vertical sectional view of FIG. 1. The magnetic thin film head 1 comprises a transparent substrate 10, and a bottom magnetic pole piece 11, an insulating layer 12, a conductive coil layer 13, an insulating layer 14, and a top magnetic pole piece 15 which are stacked in this order on the transparent substrate 10. An end portion of the bottom magnetic pole piece 11 stands face to face with an end portion of the top magnetic pole piece 15 with an end portion of the insulating layer 12 intervening therebetween to form a gap 16 of a magnetic circiut. One end portion 13A of the conductive coil layer 13 is extended outwardly for connection to an external electric circuit, and the other end portion 13B is connected to a conductor 17. The basic configuration of the magnetic thin film head 1 is disclosed, for example, in Japanese Unexamined patent publication No. 58(1983)-111115.

In the present invention, the substrate 10 is fabricated of a transparent, hard material having smooth surfaces (mirror-like surfaces). As the material of the substrate 10, it is possible to use, for example, single crystal sapphire.

Figure 3:
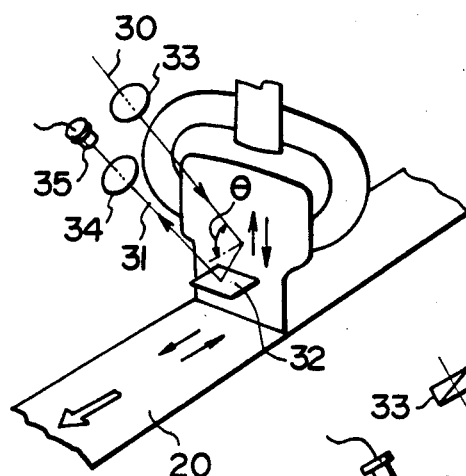
FIG. 3 is a perspective view showing an embodiment of the method of reproducing magnetically recorded information in accordance with the present invention.
Figure 4:
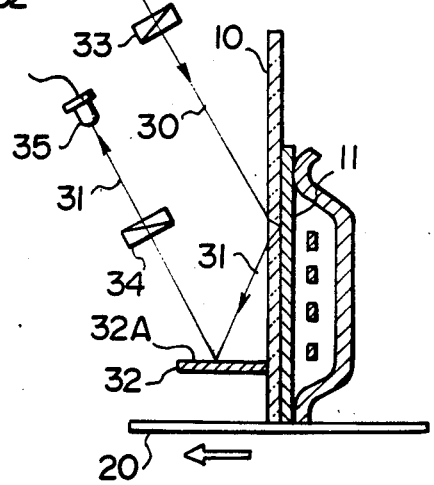
FIG. 4 is a vertical sectional view of FIG. 3, and FIGS. 5, 6 and 7 are a perspective view, a sectional side view, and a perspective view showing further embodiments of the method of reproducing magnetically recorded information in accordance with the present invention.

As shown in FIGS. 3 and 4, the magnetic thin film head 1 provided with the transparent substrate 10 is positioned on a magnetic recording medium 20 such as a magnetic tape so that the gap 16 contacts the magnetic recording medium 20. A light beam 30 such as a laser beam is passed through a polarizer 33 and is made to impinge obliquely upon the back surface of the bottom magnetic pole piece 11 via the substrate 10. The direction of incidence of the light beam 30 is adjusted so that the light beam 30 impinges upon the back surface of the bottom magnetic pole piece 11 from a position higher than the magnetic thin film head 1 at an oblique angle with respect to the back surface of the bottom magnetic pole piece 11 in a plane parallel to the internal magnetization directions of the magnetic thin film head 1 as indicated by the arrows and normal to the substrate 10. By "oblique angle" is meant such an angle that the angle $\theta$ of incidence in the aforesaid plane is approximately 60° (however, $\theta \neq 0°$, $\theta \neq 90°$, $\theta \simeq 60°$ when the magnetic pole piece is fabricated of Permalloy, and a predetermined optimal value when the magnetic pole piece is fabricated of a different material).

The incident polarized light beam 30 is reflected by the back surface of the bottom magnetic pole piece 11 reversely to the incidence direction and is then reflected upwardly by a mirror 32 having a reflection surface 32A which faces up and is parallel to the magnetic recording medium 20. At this time, in the back surface of the bottom magnetic pole piece 11, the place of polarization of the incident light beam is rotated in accordance with a change in the internal magnetization by the longitudinal Kerr effect. Therefore, when a polarized light beam 31 thus reflected is passed through an analyzer 34 and is photoelectrically detected by a photo sensor 35, the output of the photo sensor 35 indicates the direction and the degree of the internal magnetization. In this manner, it becomes possible to detect and reproduce the information recorded on the magnetic recording medium 20.

Figure 5:
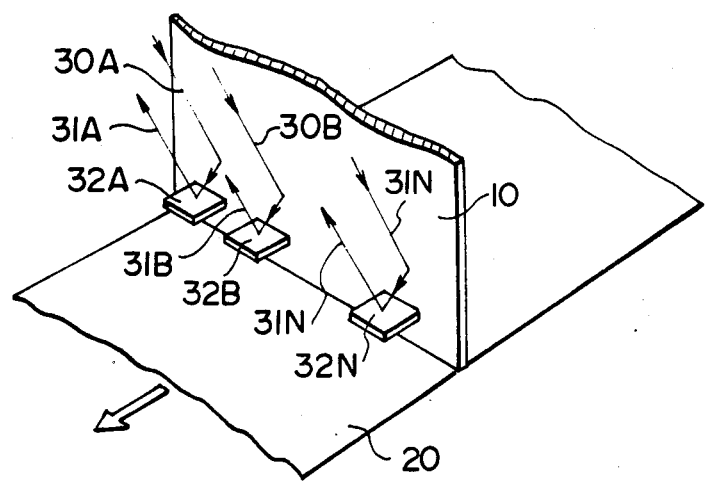

FIG. 5 shows another embodiment of the method of reproducing magnetically recorded information in accordance with the present invention, wherein the magnetic head 1 comprises many bottom magnetic pole pieces positioned in parallel with each other so that multi-head type reproduction is conducted. In FIG. 5, similar elements are numbered with the same reference numerals with respect to FIGS. 3 and 4.

In the multi-head type embodiment as described above, it becomes possible to simultaneously conduct multichannel reproduction by use of a single magnetic head unit.

The multi-channel type reproduction can be conducted by making the light beam suquentially impinge upon the heads as indicated by 30A, 30B, . . . , 30N, sequentially detecting reflected light beams 31A, 31B, . . . , 31N, and scanning the magnetic recording medium 20 in the oblique stripe form. It is also possible to position a plurality of the optical systems in parallel with each other, and to conduct signal detection simultaneously from all channels.

Though the aforesaid embodiments are for the case of magnetic tape, the present invention can be applied in the same manner to a magnetic disk. In this case, the multichannel heads should preferably be arrayed in the radial direction of the magnetic disk.

Figure 6:
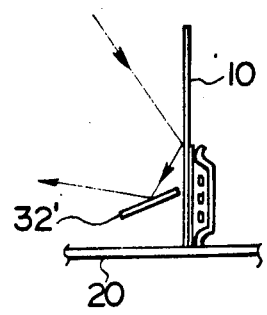
Figure 7:
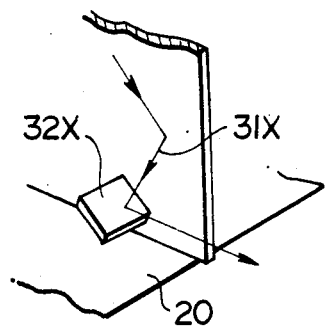

The aforesaid mirror 32 need not be exactly parallel with the surface of the magnetic recording medium 20. For example, as shown in FIG. 6, it is possible to position a mirror 32' at an angle with respect to the magnetic recording medium 20. In short, it is sufficient that the mirror 32 or 32' be positioned so as to reflect the reflected light beam coming from the substrate 10 in a direction suitable for detection. Also, as shown in FIG. 7, it is possible to position a mirror 32X so that a reflected light beam 31X is reflected laterally.

What is claimed is:
1. A method of reproducing magnetically recorded information, which comprises the steps of:
   (i) linearly polarizing a light beam and making the light beam impinge upon a part of a surface of a magnetic layer of an inductive type magnetic thin film head for detecting the recorded information on a magnetic recording medium, which is moved in contact with a gap of a magnetic circuit, on the basis of a change in internal magnetization, so that said light beam is incident at an oblique angle with respect to the surface of said magnetic layer and in a plane approximately parallel to the direction of internal magnetization at said part of the surface of said magnetic layer and approximately normal to a substrate of said magnetic thin film head,
   (ii) detecting said light beam reflected by said part of the surface of said magnetic layer, and
   (iii) detecting the direction of said internal magnetization on the basis of the rotation angle of the plane of polarization of said reflected light beam.
2. A method as defined in claim 1 wherein said magnetic thin film head is of the multi-head type comprising a plurality of magnetic layer divisions, and a plurality of light beams are made to impinge upon said magnetic layer divisions.
3. A method as defined in claim 1 wherein said magnetic thin film head is of the multi-head type comprising a plurality of magnetic layer divisions, and said magnetic layer divisions are scanned by a single light beam.

4. An apparatus for reproducing magnetically recorded information, which comprises:
(i) an inductive type magnetic thin film head for detecting the recorded information on a magnetic recording medium, which is moved in contact with a gap of a magnetic circuit, on the basis of a change in internal magnetization, said magnetic thin film head comprising a transparent substrate and a layer configuration stacked on said transparent substrate,
(ii) a polarized light beam projecting means for linearly polarizing a light beam and making the polarized light beam impinge upon a part of a surface of a magnetic layer of said magnetic thin film head via said transparent substrate so that said polarized light beam is incident at an oblique angle with respect to the surface of said magnetic layer and in a plane approximately parallel to the direction of internal magnetization at said part of the surface of said magnetic layer and approximately normal to said transparent substrate, and
(iii) a means for receiving said polarized light beam reflected by said part of the surface of said magnetic layer and detecting the angle of polarization of said reflected light beam.

5. An apparatus as defined in claim 4 wherein said polarized light beam projecting means is provided with a mirror having a reflection surface which faces up and which is approximately parallel to said magnetic recording medium.

6. An apparatus as defined in claim 4 or 5 wherein said polarized light beam projecting means comprises a laser beam source and a polarizer for polarizing a laser beam emitted by said laser beam source, and said means for detecting the angle of the plane of polarization comprises an analyzer and a photoelectric converting means for receiving the laser beam passing through said analyzer and converting the laser beam into an electric signal.

* * * * *